3,179,111
THRESHING CYLINDER IN COMBINATION
WITH A ROTARY SEPARATING DRUM
Charles S. Morrison and Henry H. Denison, Moline, Ill., assignors to Deere & Company, Moline, Ill., a corporation of Delaware
Filed May 28, 1962, Ser. No. 197,944
4 Claims. (Cl. 130—27)

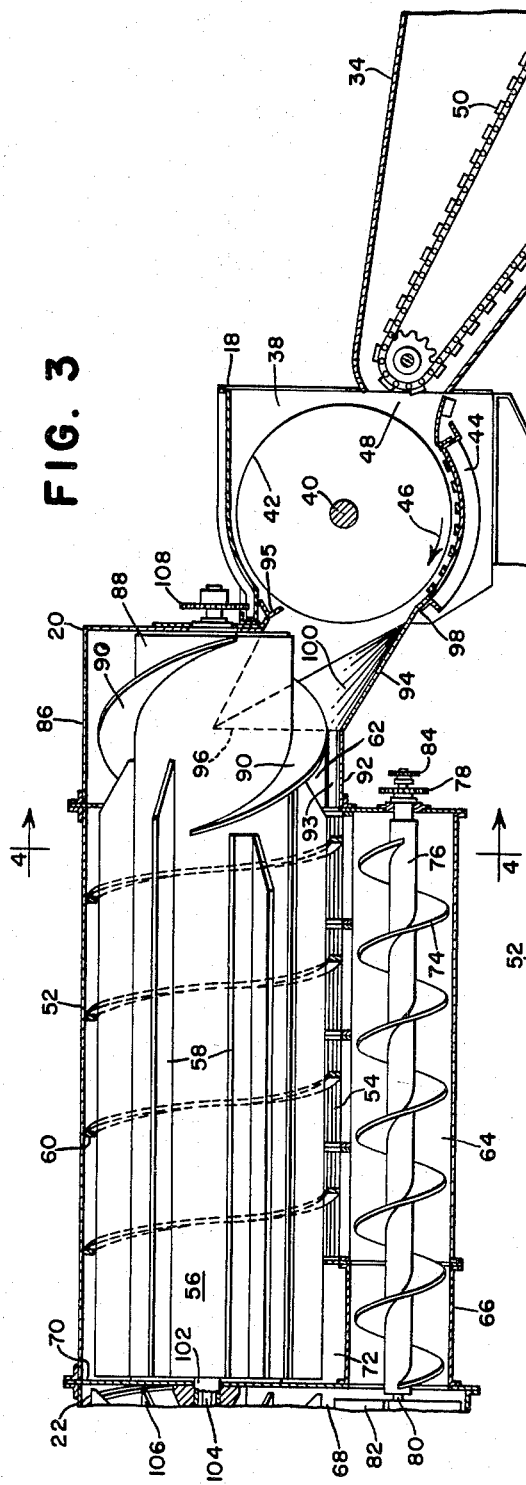
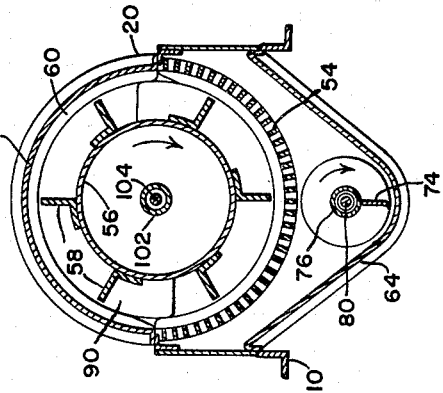

This invention relates to threshing apparatus and more particularly to improved means for feeding a thresher of the rotary type in which a rotary impeller or like means rotates within a casing for effecting the separation of grain and straw from each other.

The principal object of the invention is to provide an improved feed which delivers incoming grain from threshing means to a cylindrical casing disposed at an axis which is normal to the axis of the threshing cylinder. It is a significant feature of the invention to cause this material to deliver upwardly and generally axially of the separator cylinder or impeller. A further object of the invention resides in improved grain and straw transfer means effecting the transition from the threshing cylinder to the separator impeller, which assures a smooth even feed without clogging, bunching, shattering, etc.

The foregoing and other important objects and desirable features inherent in and encompassed by the invention will become apparent as a preferred embodiment thereof is disclosed in detail in the ensuing description and accompanying sheets of drawings, the figures of which are described below.

FIG. 3 is an enlarged longitudinal section through the feeder house, thresher cylinder and separator casing.

FIG. 4 is a transverse section on the line 4—4 of FIG. 3.

Figure 1:
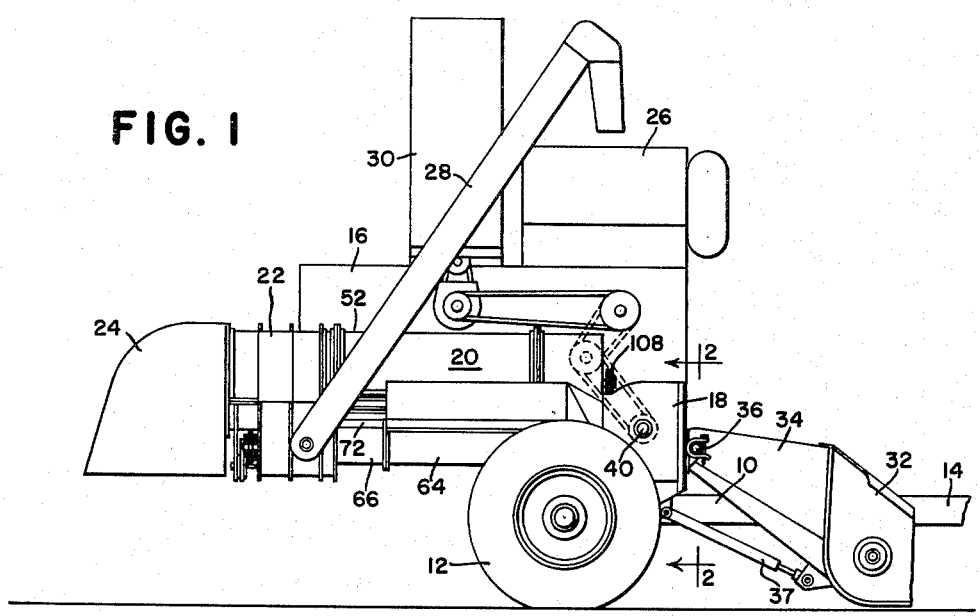
FIG. 1 is a side elevational view, with portions broken away, of a typical combine in which the inventive structur may be embodied.

The combine shown in FIG. 1 is merely typical of many forms of machines in which the inventive structure could be embodied. The illustrated machine is a combine of the drawn type, having a basic main frame 10 carried on a pair of coaxial wheels, only one of which is shown at 12, and having a forwardly extending tongue 14 by means of which the machine may be connected to any type of agricultural tractor, for example (not shown). The main frame carries thereon a generally fore and aft body structure 16 which is made up essentially of a forward thresher part 18, an intermediate separator part 20, a rearward cleaner part 22 and finally a chaff discharge hood 24. Since the "geographical" arrangement could be otherwise than as disclosed, such expressions as "front," "rear," "fore and aft," etc. should be read as illustrative and not limiting.

The remainder of the body is here shown as including a grain tank 26 to which grain is delivered via a grain elevator 28 which leads from a lower part of the cleaner 22. An internal combustion engine, appropriately shielded and screened, as at 30, furnishes the source of power for the various moving parts of the apparatus, as will be described in detail below. Grain is fed rearwardly to the thresher part 18 from a conventional header 32 which is associated in typical manner with a feeder house 34 which in turn is pivotally mounted at the front of the body on a transverse pivot axis 36 for vertical adjustment via typical adjusting means 37.

The thresher part 18 is generally in the nature of a box-like structure having laterally spaced apart upright fore and aft walls 38 (FIG. 2) which, by means of appropriate bearings not shown, journal a transverse threshing cylinder shaft 40, which is driven from the engine structure at 30 by the drive illustrated in FIG. 1. Since this in and of itself is relatively immaterial, further description of the drive is deemed to be unnecessary.

The cylinder shaft 40 carries thereon a threshing cylinder 42 which may be of any conventional construction, the axial length of which is such that its opposite ends operate respectively with relatively close clearance as respects the walls 38, and the periphery of the cylinder runs in typically close association with the threshing concave 44, the direction of rotation of the cylinder being clockwise as shown by the arrow 46 in FIG. 3. The front of the thresher part 18 is open at 48 to afford a feed opening with which the rear open end of the feeder house 34 registers so that material gathered by the header 32 ultimately reaches the threshing cylinder via a conveyor or feeder 50 in the feeder house. This conveyor may be of the type in which its lower run moves upwardly and rearwardly over the bottom or floor of the feeder house. Constructions of this nature are well known to those versed in the art, as is the threshing action that takes place between the cylinder 42 and its associated concave 44.

The separator part 20 is here shown as comprising a relatively elongated fore-and-aft cylindrical casing 52, the annular wall of which is imperforate for about 180° and which further includes in the remaining 180° a grate means 54. Coaxially journaled in the casing 52 is an impeller 56 which is provided with fore-and-aft extending radial blades 58, the outer edges of which operate in relatively close clearance with a continuous helical rib 60 which is wound about and fixed to the interior annular surface of the casing 52, including the grate means 54. Material received at the forward or inlet end 62 of the casing is caused to move rearwardly around the interior surface of the casing and over the grate means 54, the action effecting separation of grain from straw so that the grain drops through the grate means 54 into a lower conveyor or auger trough 64, whence it is moved rearwardly via a tubular extension 66 of the trough 64 to the inlet 68 of the cleaner part 22. Since the cleaner may be of any suitable construction, it has not been illustrated in detail. The straw, from which the grain is separated, is discharged at the rear of the casing 52, which is effected because the rear end of the casing terminates as a transverse rear wall 70 and the grate 54 terminates short of this wall, leaving an opening at 72 which is bypassed by the trough extension 66. The impeller blades 58 extend of course beyond the grate 54 so that discharge of straw is readily accomplished, it being understood that the straw is discharged laterally outwardly at opposite sides of and over the conveyor extension 66 without commingling with the grain already separated. The grain is moved rearwardly in the trough 64 by a conveyor, here in the form of an auger 74, having a tubular shaft 76 which may be driven at its front end in any suitable manner, here represented by a sprocket 78. A shaft 80, in this particular construction, extends coaxially through the tubular auger shaft 76 to drive a rotary member 82 which transfers the grain from the auger trough extension 66 to the cleaner casing inlet 68. A sporcket 84 on the front end of the shaft 80 may be utilized as part of the drive for the rotary element 82.

The cleaner part or casing 22 operates, in a manner not important here, to separate the grain from chaff, causing the grain to exit to a lower part of the casing 22, whence it is picked up by the elevator 28 and delivered to the grain tank 26. The chaff is discharged rearwardly and downwardly via the discharge hood 24.

From the description thus far, it will be seen that the main axis of the thresher cylinder 42 is transverse, whereas the main axis of the impeller and separator casing is fore and aft. It will also be seen that there is a vertical offset between these two axes, the separator casing axis being higher than that of the thresher cylinder. Hence, the lower portion of the thresher cylinder is spaced below the level of the separator casing inlet 62. It becomes necessary therefore to effect a transition between the thresher part and the separator part, and this is accomplished according to the present invention by effecting a change between the transverse cylinder of the thresher part and the fore and aft cylinder of the separator part.

For this purpose, the separator casing has a forward extension 86 which in its upper part is generally semi-cylindrical so as to embrace from above a forward extension 88 of the impeller core, on which part is wound a pair of partially helical blades, which function to move grain and straw rearwardly from the thresher cylinder to the interior of the separator casing. The lower part of the structure 86 includes a portion 92 which is in effect a continuation of the cylinder of the part 86, but this portion terminates short of the threshing cylinder because of the differences in height and shape, which difference is accommodated by a transition means 94.

Figure 2:
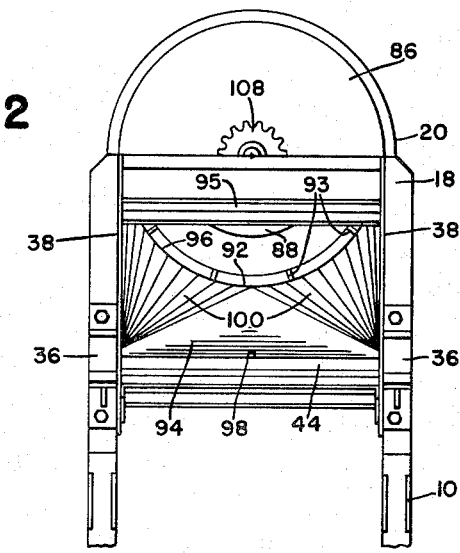
FIG. 2 is an enlarged front elevational view, with portions removed, as would be seen generally along the line 2—2 of FIG. 1.

The transition 94 is so shaped that at its rear portion it is semi-cylindrical at 96 to match the lower semi-cylindrical portion of the casing part 86; and the transition at its forward edge is straight and transversely disposed as to mate with or join the rear part of the concave 44 at a junction 98. The sides of the transition will of course diverge upwardly and rearwardly as sections of cones, as at 100 (FIGS. 2 and 3). Thus, the transition effects grain and straw transfer means between the thresher part 18 and the underside of the casing extension 86 so that material discharged rearwardly by the thresher cylinder will enter the separator part 20 from below. As will be seen, the impeller extension 88, with its spiral blades 90, extends into the transition zone so as to pick up the material delivered by the thresher cylinder and will feed this material rearwardly into the separator casing for separation of the grain from the straw as the impeller rotates and moves the material axially in the casing via the helical rib 60.

The impeller may be mounted on a coaxial tubular shaft 102 so as to rotate in a counterclockwise direction as indicated by the arrow 104 in FIG. 4. Consequently, as the material is moved upwardly and rearwardly via the transition 94 from the thresher cylinder to the separator casing inlet 62, the blades 90 on the impeller extension 88 immediately receive this material and move it rearwardly over the grate 54, it being understood of course that the grain and straw will be circulated about the interior of the casing and over the grate because of the combined action of the straight blades 58 on the impeller and the helical rib 60 within the casing. This has several distinct advantages over feeding the material from the top, where it is apt to bridge between the blades 58 unless the impeller speed is decreased to a point where separation efficiency falls off. In contrast to this the "undershot" feed of the present invention provides proper feeding while enabling the impeller speed to be kept high enough for separating efficiency, because the momentum of the material fed upwardly and rearwardly by the threshing cylinder is exploited in conjunction with the rotary or auger feed means 90 to get the material moving onto and over the grate.

This feature is further augumented by the provision of a plurality of material-directing or stripper means in the form of bars 93 spaced angularly apart about the semi-circular portion 92. These bars are parallel to the axis of the impeller and thus cooperate with the feed means, or auger 90 in getting the material quickly onto the grate or into the casing and thus out of the way of further incoming material.

A cut-off is shown at 95 to prevent back-feeding of material forwardly over the cylinder 42. This is located a sufficient angular distance in a clockwise direction from the rear end of the concave so as to insure proper feeding over the transition 94 without choking, carryover etc. In short, the overall arrangement, including the transition 94, is effected so that the transfer is accomplished smoothly and evenly, which contributes to the overall efficiency of the threshing and separating function.

By way of further explanation, the hollow impeller shaft 102 carries within it a shaft of smaller diameter as at 104 for driving a blower (not shown) located at the rear of the cleaner casing 22. A cleaner casing impeller, as at 106, is mounted on the same shaft as the separator impeller. This may be driven from the front end as by a sprocket 108. These details could, of course, be varied without affecting the basic structure embodied in the arrangement between the thresher part 18 and separator part 20.

Features and advantages other than those enumerated will readily occur to those versed in the art, as will many modifications and alterations in the preferred embodiment disclosed, all of which may be achieved without departure from the spirit and scope of the invention.

What is claimed is:

1. Apparatus for threshing and separating grain from straw and the like, comprising: a generally horizontal cylindrical casing having annular wall means and front and rear ends, said casing having a straw outlet at its rear end and a circumferential bottom portion of said wall means at said front end having an opening therein affording a grain and straw inlet, and a portion of said wall means that extends between said inlet and outlet being in the form of grate means providing a grain outlet; threshing means including a threshing concave spaced forwardly from and at a level below said inlet and arcuate about an axis transverse to the casing axis and a threshing cylinder journaled on said transverse axis and closely cooperative with said concave so that the undermost portion of the cylinder is at a level below that of said inlet; means for rotating said cylinder so that said undermost portion travels upwardly and rearwardly; material transfer means extending rearwardly and upwardly from a front junction with the rear of the concave to a rear junction with the wall means about said inlet, said transfer means including transition wall means having at said front junction a flat portion substantially coextensive in width with the rear of the concave and extending upwardly and rearwardly and generally tangent to the concave and further having a rear part shaped at its rear junction to conform to the casing wall means about said inlet; rotary means coaxially within the casing and substantially coextensive with the grate means for moving grain and straw circumferentially and axially over the grate means; and a rotary part coaxially ahead of the rotary means and situated above said inlet so as to overlie the rear part of said transition wall means, said rotary part having a helical element thereon for moving grain and straw rearwardly from said inlet to said rotary means.

2. The invention defined in claim 1 in which: said rotary part is a forward extension of said rotary means.

3. The invention defined in claim 1 in which: the casing wall means includes an arcuate bottom portion intervening between the grate means and the inlet and partly embracing the rotary part from below, said intervening bottom portion having stripper means thereon for stripping said helical element.

4. The invention defined in claim 1, in which the front end of the casing includes a transverse wall and the inlets is in part in said wall as well as in said bottom portion of the wall means.

(References on following page)

References Cited by the Examiner

UNITED STATES PATENTS

| | | | |
|---|---|---|---|
| 1,193,751 | 8/16 | Bangen | 130—27.15 X |
| 2,523,259 | 9/50 | Aber | 209—300 X |
| 2,927,694 | 3/60 | Scranton et al. | 130—27.15 X |

FOREIGN PATENTS 604,937   5/60   Italy.

T. GRAHAM CRAVER, *Primary Examiner.*

ALDRICH F. MEDBERY, ANTONIO F. GUIDA,
*Examiners.*